(12) United States Patent
Markyvech

(10) Patent No.: US 7,794,280 B1
(45) Date of Patent: Sep. 14, 2010

(54) CHARGE RECEPTACLE FOR PLUG-IN ELECTRIC VEHICLE

(75) Inventor: Craig R. Markyvech, Romulus, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 12/397,852

(22) Filed: Mar. 4, 2009

(51) Int. Cl.
*H01R 13/68* (2006.01)
(52) U.S. Cl. ............... 439/620.29; 320/120; 439/34
(58) Field of Classification Search ........... 320/109; 439/34, 620.26, 620.27, 620.29, 620.31, 439/620.33; 307/10
See application file for complete search history.

(56) References Cited

U.S. PATENT DOCUMENTS

| | | | | |
|---|---|---|---|---|
| 5,301,494 A | * | 4/1994 | Peot et al. | 56/10.5 |
| 5,629,603 A | * | 5/1997 | Kinoshita | 180/65.8 |
| RE36,225 E | * | 6/1999 | Harris | 320/104 |
| 6,434,032 B1 | * | 8/2002 | Romano | 363/146 |
| 7,568,538 B2 | * | 8/2009 | Drosendahl et al. | 180/65.1 |

* cited by examiner

*Primary Examiner*—Michael C Zarroli
(74) *Attorney, Agent, or Firm*—Ingrassia Fisher & Lorenz, P.C.

(57) ABSTRACT

A vehicular electrical system includes an electrical energy storage device, a charge receptacle shaped to mate with a charge plug, at least one fuse connected to the charge receptacle, and a plurality of conductors electrically interconnecting the electrical energy storage device and the at least one fuse. Substantially all of the plurality of conductors are electrically connected between the electrical storage device and the at least one fuse.

16 Claims, 5 Drawing Sheets

CHARGE RECEPTACLE FOR PLUG-IN ELECTRIC VEHICLE

TECHNICAL FIELD

The present invention generally relates to vehicular electrical systems, and more particularly relates to a vehicular charge receptacle and systems associated with the charge receptacle.

BACKGROUND OF THE INVENTION

In recent years, advances in technology, as well as ever-evolving tastes in style, have led to substantial changes in the design of automobiles. One of the changes involves the complexity of the electrical systems within automobiles, particularly alternative fuel vehicles, such as hybrid, battery electric, and fuel cell vehicles. Such alternative fuel vehicles typically use one or more electric motors, perhaps in combination with another actuator, to drive the wheels. With recent fluctuations in fossil fuel prices, it is now more desirable than ever to power automobiles with electric power, as with hybrid vehicles.

"Plug-in" electric vehicles and plug-in hybrid electric vehicles may meet this need, as they allow the vehicle's battery system to be charged while the vehicle is not in use. The charging of the battery system may be performed at public charging stations, such as while the driver is at a shopping mall, or private charging stations that are set up in the driver's garage at home and may be used overnight. However, such charging stations are connected to the power grid, which is capable of providing more than the maximum amount of current that may typically be safely carried by wiring used in electric vehicles. Therefore, in the event of a fault or short, an over-current condition may occur which may damage the wiring, as well as generate an undesirable amount of heat.

Fuses are often provided in the vehicles to prevent such conditions from occurring. However, because of the placement of the fuses, some of the wiring in the vehicle that is used to provide grid power (i.e., power from the electrical grid) to the charger that is used to charge the battery may not be protected by the fuses.

Accordingly, it is desirable to provide a charge receptacle and associated systems that minimize the amount of wiring that is not protected by the fuses in such vehicles and are fully compliant with the standards set by the appropriate regulatory authorities. Furthermore, other desirable features and characteristics of the present invention will become apparent from the subsequent description taken in conjunction with the accompanying drawings and the foregoing technical field and background.

SUMMARY OF THE INVENTION

A vehicular electrical system is provided. The vehicular electrical system includes an electrical energy storage device, a charge receptacle shaped to mate with a charge plug, at least one fuse connected to the charge receptacle, and a plurality of conductors electrically interconnecting the electrical energy storage device and the at least one fuse. Substantially all of the plurality of conductors are electrically connected between the electrical storage device and the at least one fuse.

An automotive charge receptacle is provided. The automotive charge receptacle includes a main body having an engagement formation thereon, the engagement formation being shaped to mate with a charge plug, and at least one fuse removably connected to the main body in a substantially fixed position.

An electric vehicular charging system is provided. The electric vehicular charging system includes a battery charger having a power supply and a charge plug electrically connected to the power supply, a charge receptacle having an engagement formation shaped to mate with the charge plug, and at least one fuse removably housed within the charge receptacle. The charge plug and the charge receptacle are configured such that the at least one fuse is not manually removable from the charge receptacle when the charge plug is mated with the engagement formation.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

Figure 1:
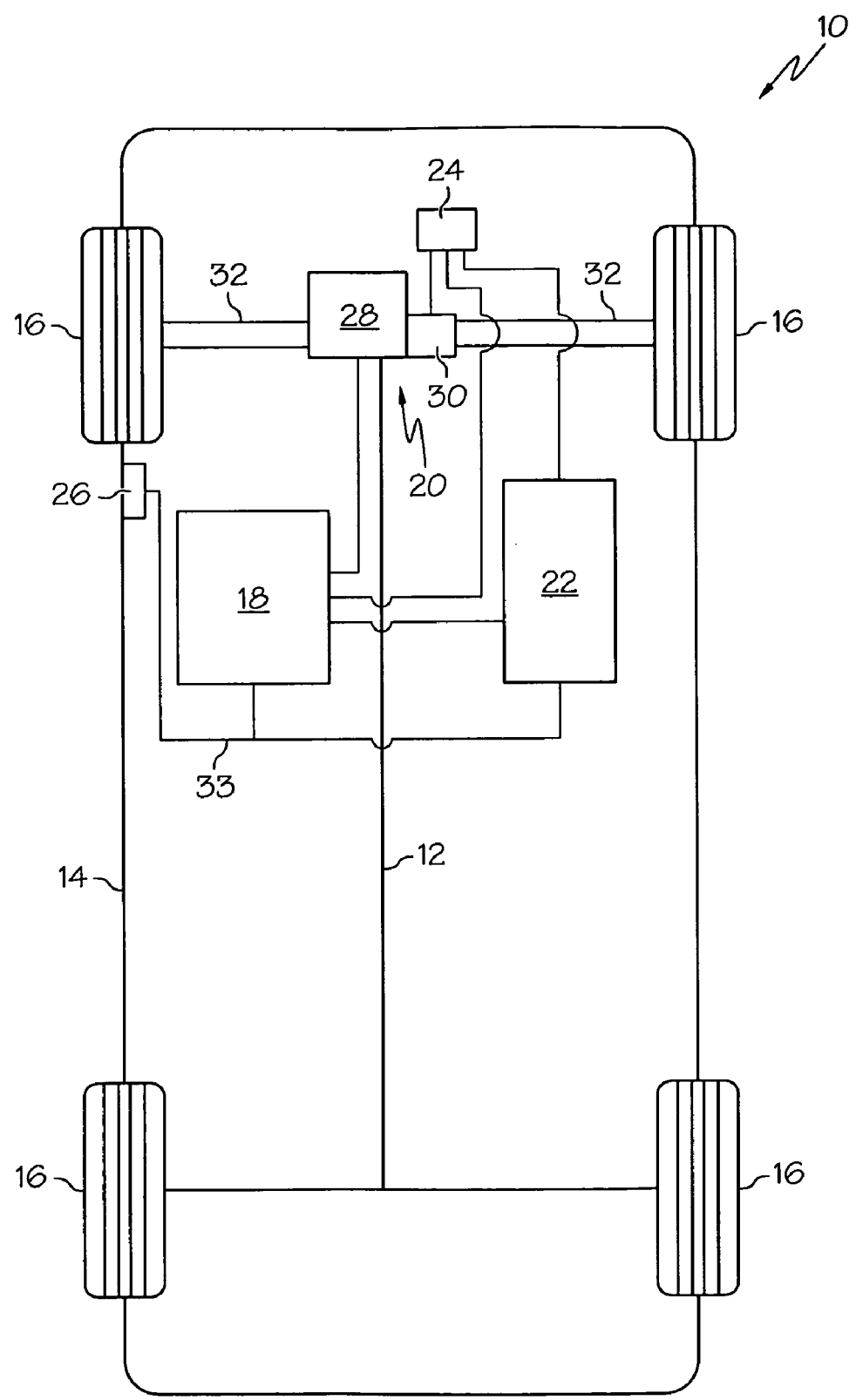
FIG. 1 is a schematic view of an exemplary vehicle according to one embodiment of the present invention.

The following detailed description is merely exemplary in nature and is not intended to limit the invention or the application and uses of the invention. Furthermore, there is no intention to be bound by any expressed or implied theory presented in the preceding technical field, background, and brief summary, or the following detailed description.

The following description refers to elements or features being "connected" or "coupled" together. As used herein, "connected" may refer to one element/feature being mechanically joined to (or directly communicating with) another element/feature, and not necessarily directly. Likewise, "coupled" may refer to one element/feature being directly or indirectly joined to (or directly or indirectly communicating with) another element/feature, and not necessarily mechanically. However, it should be understood that although two elements may be described below, in one embodiment, as being "connected," in alternative embodiments similar elements may be "coupled," and vice versa. Thus, although the schematic diagrams shown herein depict example arrangements of elements, additional intervening elements, devices, features, or components may be present in an actual embodiment.

Further, various components and features described herein may be referred to using particular numerical descriptors, such as first, second, third, etc., as well as positional and/or angular descriptors, such as horizontal and vertical. However, such descriptors may be used solely for descriptive purposes relating to drawings and should not be construed as limiting, as the various components may be rearranged in other embodiments. It should also be understood that FIGS. 1-5 are merely illustrative and may not be drawn to scale.

FIG. 1 to FIG. 5 illustrate a vehicular electrical system, according to one aspect of the present invention. The vehicu-} lar electrical system includes an electrical energy storage device, a charge receptacle shaped to mate with a charge plug, at least one fuse connected to the charge receptacle, and a plurality of conductors electrically interconnecting the electrical energy storage device and the at least one fuse. Substantially all of the plurality of conductors are electrically connected between the electrical storage device and the at least one fuse.

According to another aspect of the present invention, an automotive charge receptacle is provided. The automotive charge receptacle includes a main body having an engagement formation thereon, the engagement formation being shaped to mate with a charge plug, and at least one fuse removably connected to the main body in a substantially fixed position.

An electric vehicular charging system is also provided. The electric vehicular charging system includes a battery charger having a power supply and a charge plug electrically connected to the power supply, a charge receptacle having an engagement formation shaped to mate with the charge plug, and at least one fuse removably housed within the charge receptacle. The charge plug and the charge receptacle are configured such that the fuses can not be manually removed from the charge receptacle when the charge plug is mated with the engagement formation.

FIG. 1 illustrates a vehicle (or "automobile") 10, according to one embodiment of the present invention. The vehicle 10 includes a chassis 12, a body 14, four wheels 16 (although other embodiments may have two or three wheels), and an electronic control system 18. The body 14 is arranged on the chassis 12 and substantially encloses the other components of the vehicle 10. The body 14 and the chassis 12 may jointly form a frame. The wheels 16 are each rotationally coupled to the chassis 12 near a respective corner of the body 14.

The vehicle 10 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD), or all-wheel drive (AWD). The vehicle 10 may also incorporate any one of, or combination of, a number of different types of engines, such as, for example, a liquid-fueled internal combustion engine, a gaseous compound (e.g., hydrogen and/or natural gas) fueled engine, a combustion/electric motor hybrid engine, and an electric motor.

Examples of fuels that may be used for combustion engines intended to be included within the scope of this invention include gasoline, diesel, "flex fuel" (i.e., a mixture of gasoline and alcohol), methanol, methyl tetrahydrofuran mixtures, various biodiesels, and liquefied petroleum gas (LPG). It should also be understood that the combustion engines may be either internal combustion engines or external combustion engines (e.g., a Carnot heat engine).

In the exemplary embodiment illustrated in FIG. 1, the vehicle 10 is a plug-in hybrid electric vehicle (or plug-in hybrid vehicle), and further includes an actuator assembly 20, a battery system (or battery) 22, a power converter assembly (e.g., an inverter assembly) 24, and a battery charge port 26. The actuator assembly 20 includes an internal combustion engine 28 and an electric motor/generator (or motor) 30.

As will be appreciated by one skilled in the art, the electric motor 30 includes a transmission therein, and although not illustrated also includes a stator assembly (including conductive coils), a rotor assembly (including a ferromagnetic core), and a cooling fluid (i.e., coolant). The stator assembly and/or the rotor assembly within the electric motor 30 may include multiple electromagnetic poles (e.g., sixteen poles), as is commonly understood.

Still referring to FIG. 1, in one embodiment, the combustion engine 28 and the electric motor 30 are integrated such that both are mechanically coupled to at least some of the wheels 16 through one or more drive shafts 32.

Although not shown, the battery system (or direct current (DC) power supply or electrical energy storage device source) 22 may include a 12V, lead-acid starter-lighting-ignition (SLI) battery, as well as a high voltage battery suitable for powering the electric motor 30 (e.g., a lithium ion battery).

Although not shown in detail, in one embodiment, the inverter 24 includes a three-phase circuit coupled to the motor 30. More specifically, the inverter 24 includes a switch network having a first input coupled to a voltage source Vdc (e.g., the battery 22) and an output coupled to the motor 30. The switch network comprises three pairs (a, b, and c) of series switches with antiparallel diodes (i.e., antiparallel to each switch) corresponding to each of the phases of the motor 30. As is commonly understood, each of the switches may be in the form of individual semiconductor devices such as insulated gate bipolar transistors (IGBTs) within integrated circuits formed on semiconductor (e.g. silicon) substrates (e.g., die).

The electronic control system 18 is in operable communication with the actuator assembly 20, the high voltage battery 22, the inverter assembly 24, and the fuel tank 26. Although not shown in detail, the electronic control system 18 includes various sensors and automotive control modules, or electronic control units (ECUs) or modules (ECMs), such as an inverter control module and a vehicle controller, and at least one processor and/or a memory which includes instructions stored thereon (or in another computer-readable medium) for carrying out the processes and methods as described below.

As shown in FIG. 1, the battery charge port 26 and the battery 22, as well as other components within the vehicle 10, are in operable communication and/or electrically connected through conductors (e.g., flexible conductive wires) 33. In one embodiment, the conductive wires 33 are 14 American wire gauge (AWG), as is commonly understood, although different gauges may be used in other embodiments. The components of the vehicle 10 interconnected by the conductors 33 may be understood to form an electrical system within the vehicle 10.

Figure 2:
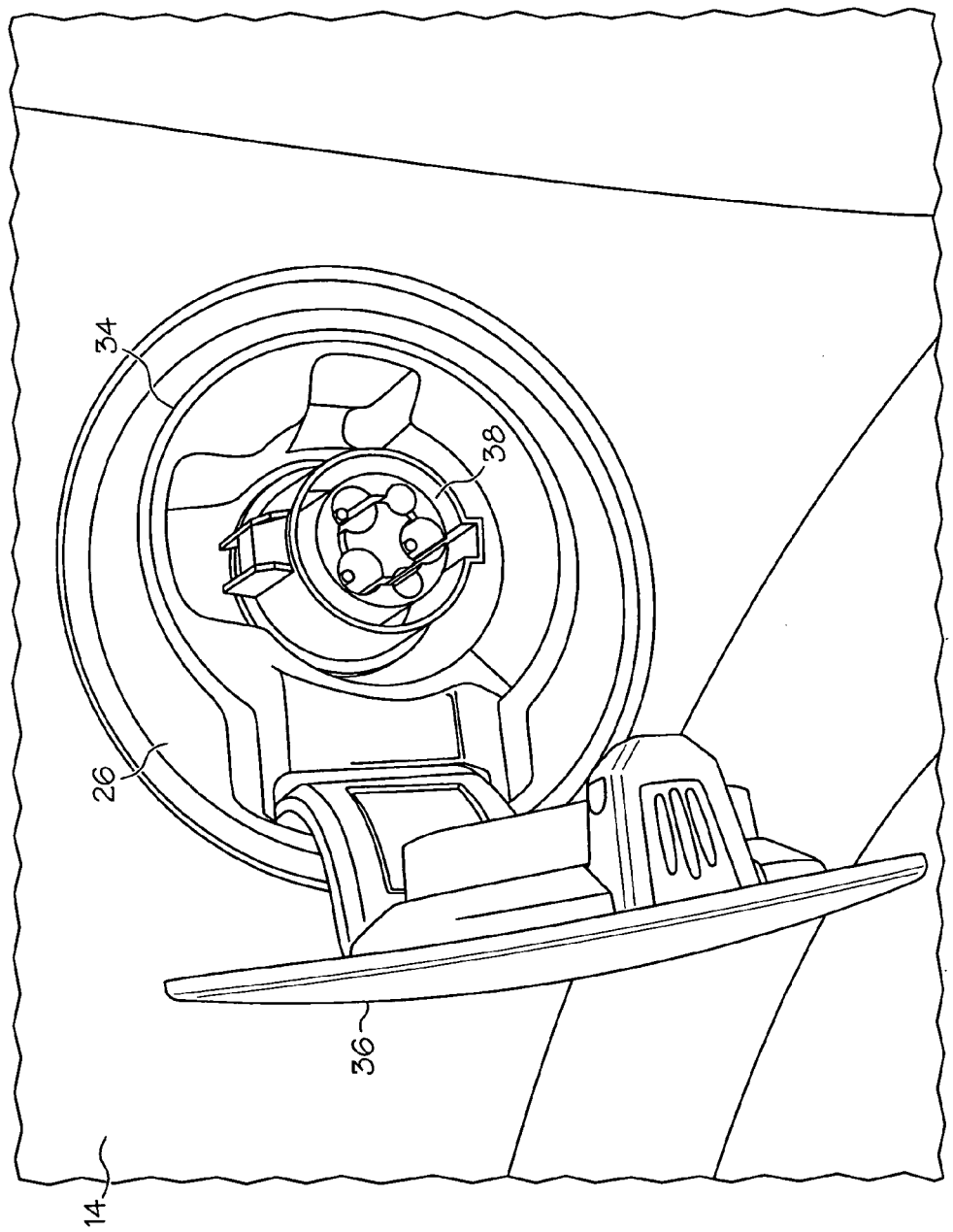
FIG. 2 is a perspective view of a battery charge port on a body of the vehicle of FIG. 1.

As shown in FIG. 1, the battery charge port 26 is located on an outer wall of the body 14 of the vehicle 14 near one of the wheels 16 (e.g., the front, driver's side wheel). FIG. 2 illustrates the battery charge port 26 in greater detail. As shown, the battery charge port 26 extends through a substantially circular opening 34 in an outer wall of the body 14. In the depicted embodiment, the body 14 of the vehicle 10 includes a door 36 that is connected to the remainder of the body 14 in a hinged fashion such that it is moveable between "opened" position (as shown) and a "closed" position in which the charge port 26 is covered.

Figure 3:
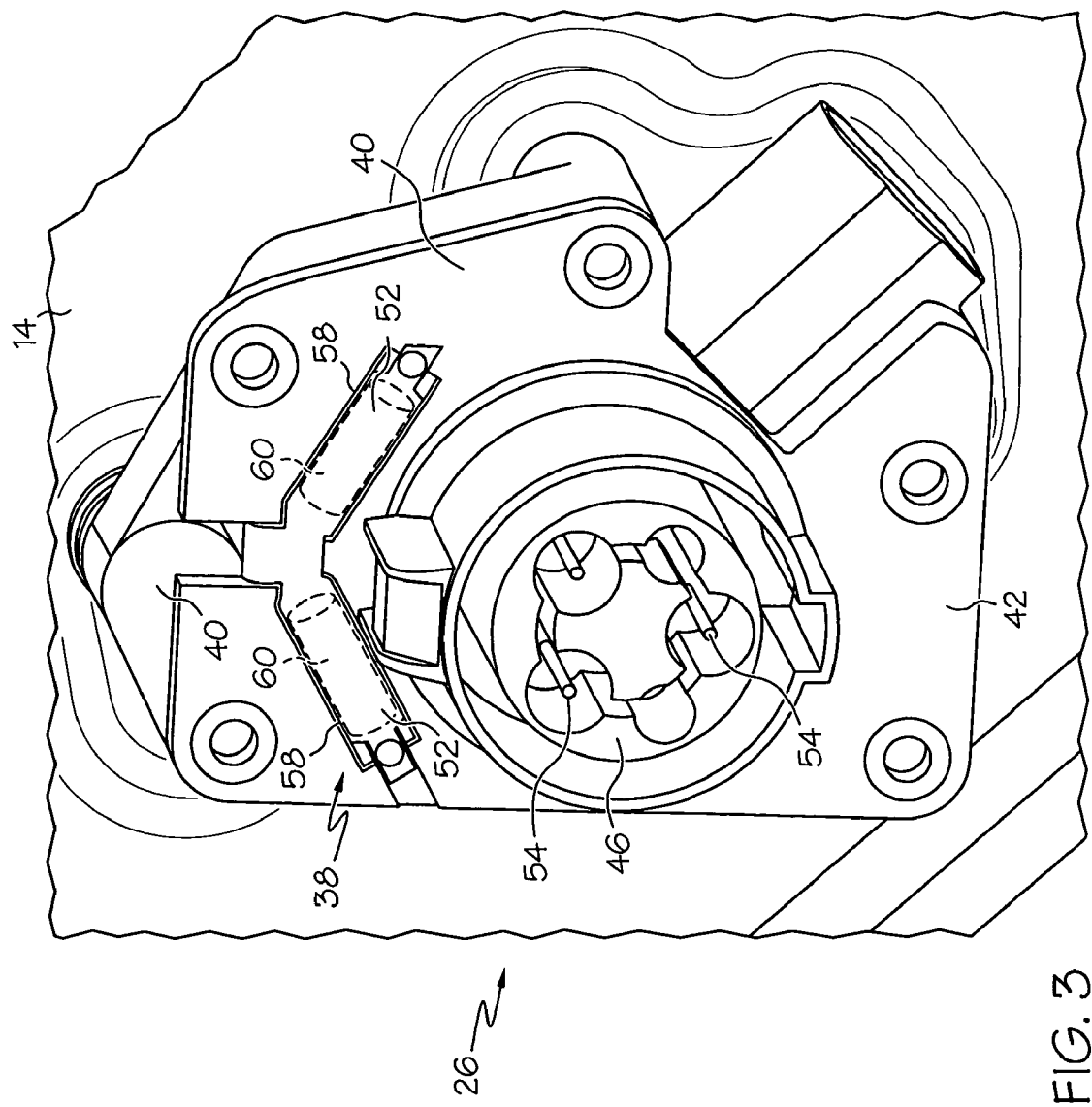
FIG. 3 is an isometric view of a first side of a charge receptacle within the charge port of FIG. 2.
Figure 4:
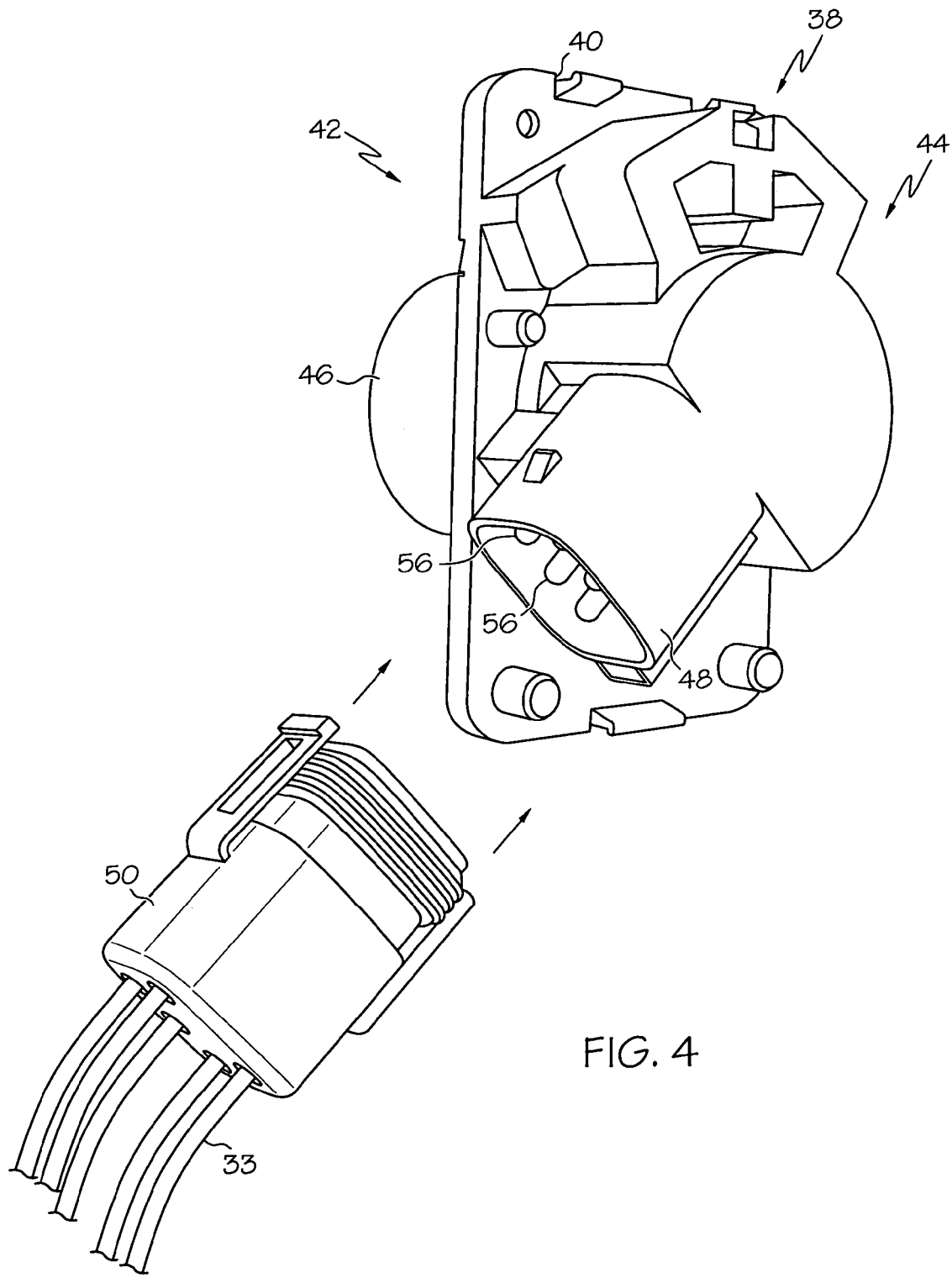
FIG. 4 is an isometric view of a second side of the charge receptacle of FIG. 3 and a wire harness.

Referring to FIGS. 2, 3, and 4, the battery charge port 26 includes a charge receptacle 38 that is connected to an inner wall of the body 14 by a spacer 40. The charge receptacle 38 includes a substantially integral main body 40 that is, in one embodiment, made of an injection-molded plastic. The main body 40 is substantially plate-shaped and has first and second opposing sides 42 and 44.

Referring specifically to FIG. 3, the first side 42 of the main body 40 (and/or the charge receptacle 38) includes a first engagement formation 46 connected thereto. The first engagement formation 46 (and/or the first side 42 of the main body 40) is sized and shaped to mate with a charge plug. In one specific embodiment, the first engagement formation 46 is sized and shaped to mate with a charge plug that is in compliance with a Society of Automotive Engineers (SAE) standard 1772 (described below), as will be understood by one skilled in the art.

Referring specifically to FIG. 4, the second side 44 of the main body 40 includes a second engagement formation 48 connected thereto. The second engagement formation 48 (and/or the second side 44 of the main body 40) is sized and shaped to mate with a wire harness 50 that is included within the electrical system of the vehicle 10 and at least partially houses the ends of the conductive wires 33.

Still referring to FIGS. 2, 3, and 4, the charge receptacle 38 also includes fuses 52, a first set of conductive members 54, and a second set of conductive members 56. The fuses 52 (FIG. 3) are removably housed within fuse cavities 58 formed on the first side 42 of the main body 40 above the first engagement formation 46. It should be noted that when the fuses 52 are housed within the fuse cavities 58, the fuses are connected to the charge receptacle 38 is a substantially fixed position. That is, if the charge receptacle is removed from the body 14 of the vehicle 10, the fuses 52 are also removed.

In the depicted embodiment, the fuse cavities 58 are covered by removable fuse covers 60 that are made of a flexible rubber-like material and connected to the main body 40 at adjacent ends of the fuse cavities 58. In one embodiment, the fuses 52 are ceramic fuses. The fuses may be rated to, for example, 20 amperes (A) and 120 alternating current volts (VAC).

The first set of conductive members 54 includes a series of pins positioned within the first engagement formation 46 that are electrically connected to a first side of the fuses 52, while the second set of conductive members 56 includes a series of pins positioned within the second engagement formation 48 that are electrically connected to a second side of the fuses 52. It should be noted that the pins used in the first and second sets of conductive members 54 and 56 may be partially embedded into the charge receptacle 38 and thus fixed in placed relative to the charge receptacle 38.

As such, an electrical pathway is formed through the first set of conductive members 54, the fuses 52, and the second set of conductive members 56 and into the conductive wires 33 when the wire harness 50 is mated with the second engagement formation 48. Of particular interest is the relative length of the conductive pathway on the opposing electrical sides of the fuses. That is, the electrical pathway as measured from the ends of the first set of conductive members 54 to the fuses 52 may be as short as 1 inch or less, while the electrical pathway as measured from the fuses 52 to the battery 22 (and/or the other components of the electrical system) may be as long as 15 feet. In other words, virtually all of the conductors and wires (and all of the other components of the electrically system) that are electrically connected to the charge receptacle 38 are electrically connected to the second sides of the fuses 52.

During operation, referring to FIG. 1, the vehicle 10 is operated by providing power to the wheels 16 with the combustion engine 28 and the electric motor 30 in an alternating manner and/or with the combustion engine 28 and the electric motor 30 simultaneously. In order to power the electric motor 30, DC power is provided from the battery 22 (and, in the case of a fuel cell automobile, a fuel cell) to the inverter 24, which converts the DC power into AC power, before the power is sent to the electric motor 30.

Figure 5:
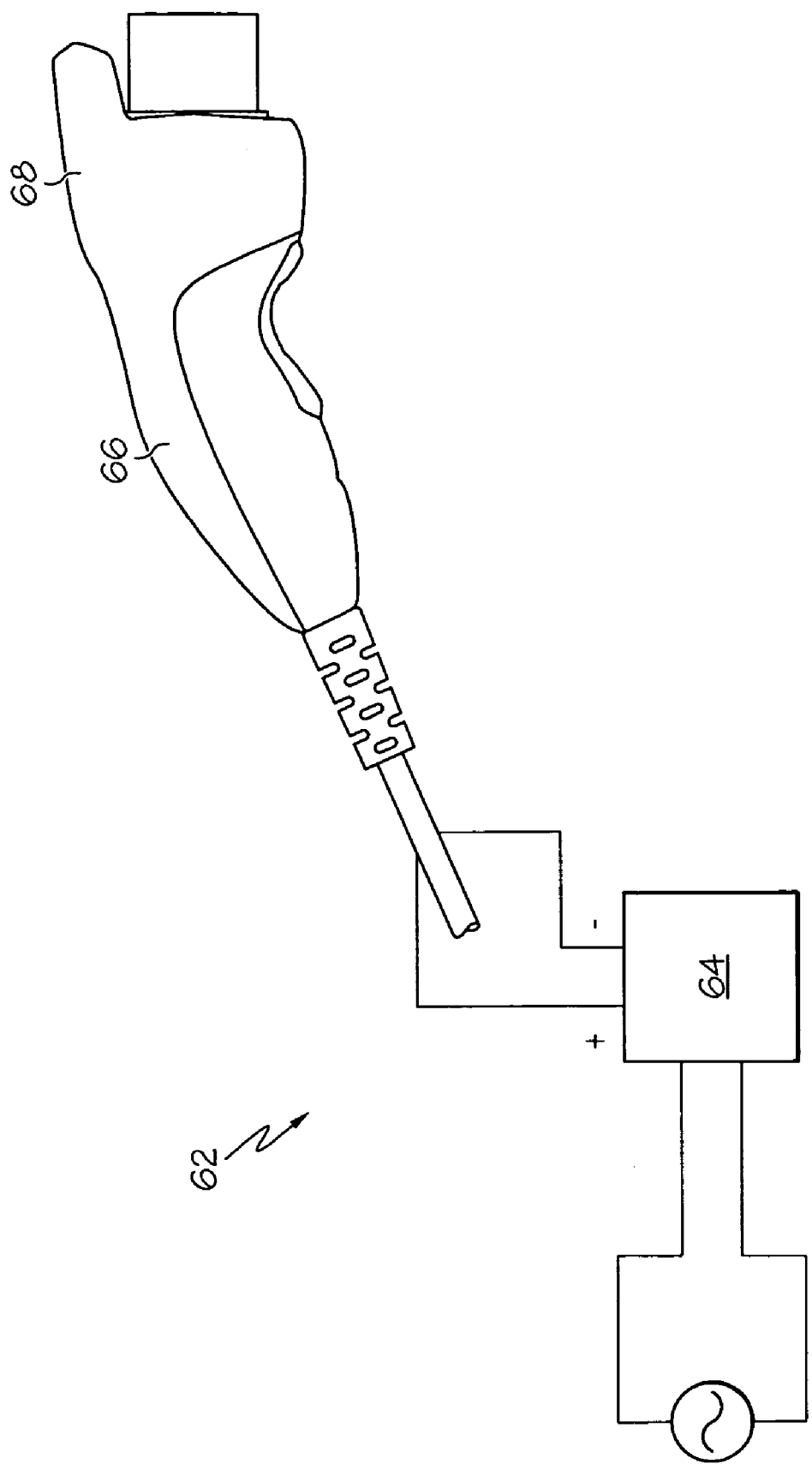
FIG. 5 is a schematic view of a battery charger, including a charge plug, according to one embodiment of the present invention.

When the vehicle 10 is not in use, or any time the user wishes to charge the battery 22 (e.g., the high voltage battery), a battery charger, or charging station, may be connected to the charge port 26. One example of a battery charger 62 is shown in FIG. 5. The battery charger 62 includes a power supply (and/or inverter) 64 and a charge plug 66. The power supply 64 provides DC power to the charge plug 66 from an AC power source (e.g., a wall socket connected to the main power grid). The charge plug 66 is electrically connected to the power supply 64 and includes an alignment prong 68 extending from an upper side thereof. In one embodiment, the charge plug is a SAE standard 1772 compliant charge plug.

To charge the battery 22, the charge plug 66 may be mated with the battery charge port 26 (and/or the charge receptacle 38). When the charge plug 66 is mated with charge receptacle 38, conductors within charge plug 66 (not shown) contact the first set of conductive members 54 such that current flows through the charge receptacle 38 and the conductive wires 33 to the battery 22. As such, the battery 22 is charged.

When the charge plug 66 is mated with the charge receptacle 38, the alignment prong 68 on the charge plug 66 substantially covers, or blocks, the fuse covers 60 and/or the fuse cavities 58 on the charge receptacle 38. Therefore, when the charge plug 66 is connected to the charge receptacle 38 (i.e., when the battery 22 is being charged), the fuses 52 may not be accessed by opening the fuse covers 60 and/or manually removed from the charge receptacle 38, even if the charge receptacle 38 is taken off the body 14 of the vehicle 10. In other words, a user may only manually remove the fuses 52 from the charge receptacle 38 when the charge plug 66 is not connected to, or mated with, the charge receptacle 38.

One advantage is that because all of the wiring (i.e., the flexible conductive wires), and virtually all of the conductors, within the vehicle are electrically connected to the charger (and thus the power grid) through the fuses. Thus, all of the wiring (and virtually all of the conductors) is protected by the fuses. As a result, the likelihood that any of the wiring (and/or conductors) will be damaged by an over-current condition. Another advantage is that because of the arrangement of the first engagement formation and the fuse cavities on the charge receptacle, as well as the shape of the charge plug, the fuses may not be accessed and removed while the battery is being charged. Thus, the system described above may fully comply with safety standards set by the appropriate regulatory authorities.

As described above, the automobile shown in the drawings and described above is merely intended as one example of a vehicle in which the charge receptacle may be used. It should be noted that the charge receptacle may also be used in other types of land vehicles, such as motorcycles and personal transportation devices, as well as other categories of vehicles, such as watercraft and aircraft.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A vehicular electrical system comprising:
   an electrical energy storage device;
   a charge receptacle shaped to mate with a charge plug;
   at least one fuse connected to the charge receptacle; and
   a plurality of conductors electrically interconnecting the electrical energy storage device, the charge receptacle, and the at least one fuse, wherein substantially all of the plurality of conductors are electrically connected between the electrical storage device and the at least one fuse.

2. The vehicular electrical system of claim 1, wherein the plurality of conductors comprises a plurality of conductive members connected to the charge receptacle and a plurality of conductive wires, and all of the plurality of conductive wires are electrically connected between the electrical energy storage device and the at least one fuse.

3. The vehicular electrical system of claim 2, wherein the plurality of conductive members comprises a plurality of conductive pins electrically connected to a first side of the at least one fuse and the plurality of conductive wires are electrically connected to a second side of the at least one fuse.

4. The vehicular electrical system of claim 3, further comprising a wire harness at least partially housing at least some of the plurality of conductive wires.

5. The vehicular electrical system of claim 4, wherein the charge receptacle comprises first and second opposing sides, a first engagement formation on the first side thereof and shaped to mate with the charge plug, and a second engagement formation on the second side thereof and shaped to mate with the wire harness.

6. The vehicular electrical system of claim 5, wherein the plurality of conductors further comprises a second plurality of conductive members connected to the charge receptacle, wherein the second plurality of conductive members and the wire harness are arranged such that when the wire harness is mated with the second engagement formation, the second plurality of conductive members electrically interconnect the at least one fuse and the plurality of conductive wires.

7. The vehicular electrical system of claim 1, wherein the at least one fuse is removably connected to the charge receptacle in a substantially fixed position.

8. The vehicular electrical system of claim 7, wherein the at least one fuse is at least partially housed within the charge receptacle.

9. The vehicular electrical system of claim 8, wherein the charge receptacle is configured such that the at least one fuse is manually removable from the charge receptacle only when the charge plug is not mated with the charge receptacle.

10. The vehicular electrical system of claim 9, wherein the charge receptacle is shaped to mate with a Society of Automotive Engineers (SAE) standard 1772 compliant charge plug.

11. An electric vehicular charging system comprising:
    a battery charger comprising a power supply and a charge plug electrically connected to the power supply; and
    a charge receptacle having an engagement formation shaped to mate with the charge plug;
    at least one fuse removably housed within the charge receptacle, wherein the charge plug and the charge receptacle are configured such that the at least one fuse is not manually removable from the charge receptacle when the charge plug is mated with the engagement formation;
    a battery; and
    a plurality of conductors electrically interconnecting the battery, the at least one fuse, and the engagement formation, wherein substantially all of the plurality of conductors are electrically connected between the battery and the at least one fuse.

12. The electric vehicle charge system of claim 11, wherein the charge plug is a Society of Automotive Engineers (SAE) standard 1772 compliant charge plug.

13. The electric vehicle charge system of claim 11, wherein the plurality of conductors comprises a plurality of conductive members connected to the charge receptacle and electrically interconnecting the engagement formation and the at least one fuse and a plurality of conductive wires, all of the plurality of conductive wires being electrically connected between the battery and the at least one fuse.

14. The electrical vehicle charge system of claim 13, wherein the plurality of conductive members comprises a plurality of conductive pins that electrically interconnect the charge plug and the at least one fuse when the charge plug is mated with the engagement formation.

15. A vehicular electrical system comprising:
    an electrical energy storage device;
    a charge receptacle shaped to mate with a charge plug;
    at least one fuse removably connected to the charge receptacle in a substantially fixed position and at least partially housed within the charge receptacle; and
    a plurality of conductors electrically interconnecting the electrical energy storage device and the at least one fuse, wherein substantially all of the plurality of conductors are electrically connected between the electrical storage device and the at least one fuse,
    wherein the charge receptacle is configured such that the at least one fuse is manually removable from the charge receptacle only when the charge plug is not mated with the charge receptacle.

16. The vehicular electrical system of claim 15, wherein the charge receptacle is shaped to mate with a Society of Automotive Engineers (SAE) standard 1772 compliant charge plug.

* * * * *